United States Patent [19]

Fling

[11] Patent Number: 5,003,564
[45] Date of Patent: Mar. 26, 1991

[54] DIGITAL SIGNAL CLAMP CIRCUITRY

[75] Inventor: Russell T. Fling, Naperville, Ill.

[73] Assignee: RCA Licensing Corporation, Princeton, N.J.

[21] Appl. No.: 333,051

[22] Filed: Apr. 4, 1989

[51] Int. Cl.⁵ .............................................. H03K 21/10
[52] U.S. Cl. .................................... 377/45; 358/172; 328/158
[58] Field of Search ................ 377/45, 126; 358/171, 358/172; 307/542; 328/158

[56] References Cited

U.S. PATENT DOCUMENTS

| | | | |
|---|---|---|---|
| 3,891,833 | 6/1975 | Rhoton et al. | 377/45 |
| 3,924,106 | 12/1975 | Keefe | 377/45 |
| 3,984,663 | 10/1976 | de Buhr et al. | 377/45 |
| 3,985,954 | 10/1976 | Kuniyoshi et al. | 358/171 |
| 4,215,371 | 7/1980 | Bagget et al. | 358/172 |
| 4,296,437 | 10/1981 | Geurts | 358/173 |
| 4,415,929 | 11/1983 | Yoshisato | 358/171 |
| 4,470,066 | 9/1984 | Wölber et al. | 358/171 |
| 4,504,741 | 3/1985 | Armitage | 377/45 |
| 4,544,951 | 10/1985 | Yoshisato | 358/172 |
| 4,707,741 | 11/1987 | Stratton | 358/171 |
| 4,718,119 | 1/1988 | Salzer et al. | 455/619 |
| 4,722,006 | 1/1988 | Kimura et al. | 358/171 |
| 4,729,026 | 3/1988 | Suzuki et al. | 358/168 |
| 4,742,392 | 5/1988 | Hashimoto | 358/172 |
| 4,786,969 | 11/1988 | Shouji et al. | 358/171 |

Primary Examiner—John S. Heyman
Attorney, Agent, or Firm—Joseph S. Tripoli; Eric P. Herrmann; James B. Hayes

[57] ABSTRACT

A digital signal clamp circuit is realized using an adder and an up/down counter. The digital signal is coupled to one input of the adder and the counter output is coupled to a second input of the adder. The up/down counter is enabled to count only during signal intervals exhibiting the desired clamping level. The counter is controlled to count up or down depending on the polarity of the signal provided by the adder. The count value in the counter is continuously applied to the adder to provide clamping. Using a truncated count value from the counter enhances clamping performance.

9 Claims, 2 Drawing Sheets

DIGITAL SIGNAL CLAMP CIRCUITRY

This invention relates to a digital signal clamp circuit.

BACKGROUND OF THE INVENTION

The invention will be described in the environment of digital video signal processing though it is to be understood to have much wider applications.

Signals, such as television signals, have a brightness component which must be referenced to a DC value to extract its information content. However, broadcasting such a signal tends to eliminate or lose the DC value. In order to reestablish a DC reference for the brightness component, television receivers are equipped with clamp circuitry. Typically this clamp circuitry is energized during the horizontal synchronization pulse, and responsive to the amplitude of this pulse sets the DC level for the remainder of the signal. This approach has proven to be quite satisfactory for most video signal processing applications.

It will readily be recognized by those skilled in the art of video signal processing that the amplitudes of horizontal sync pulses may vary from channel to channel. A consequence of this variation is that the absolute value of the clamped DC level will change from channel to channel.

The channel to channel variation is normally of little consequence in standard receivers. However in pix-in-pix receivers, which simultaneously display images from two channels in exclusive portions of the display screen, a difference in the brightness of the two images may be annoying to certain viewers. Therefore, it is desirable to be able to clamp the DC level of at least one of the signals to a specific value. In the instance of this invention it is the blanking level of the brightness signal. The blanking level of the brightness signal immediately precedes the active portion of a standard television signal and is relatively easily sampled.

It is an object of this invention to provide a blanking level clamp operative with binary or pulse code modulated (PCM) signals.

SUMMARY OF THE INVENTION

The present invention is a digital clamp circuit including an up/down counter, an adder and circuitry for enabling the up/down counter during a predetermined interval of a digital signal to be clamped. The adder has a first input port coupled to receive the signal to be clamped and a second input port coupled to a count value output from the counter. During intervals that the counter is enabled it is conditioned to count up or down by the polarity bit of the sum signal provided by the adder. In one embodiment the direction of counting is selected to drive the output of the adder toward zero. Ultimately, the output of the counter that is applied to the adder will equal the negative of the value exhibited by the signal during the interval that the counter is enabled. This value is applied to the adder during the remainder of the signal, thereby establishing the DC value of the signal.

DETAILED DESCRIPTION

Figure 1:
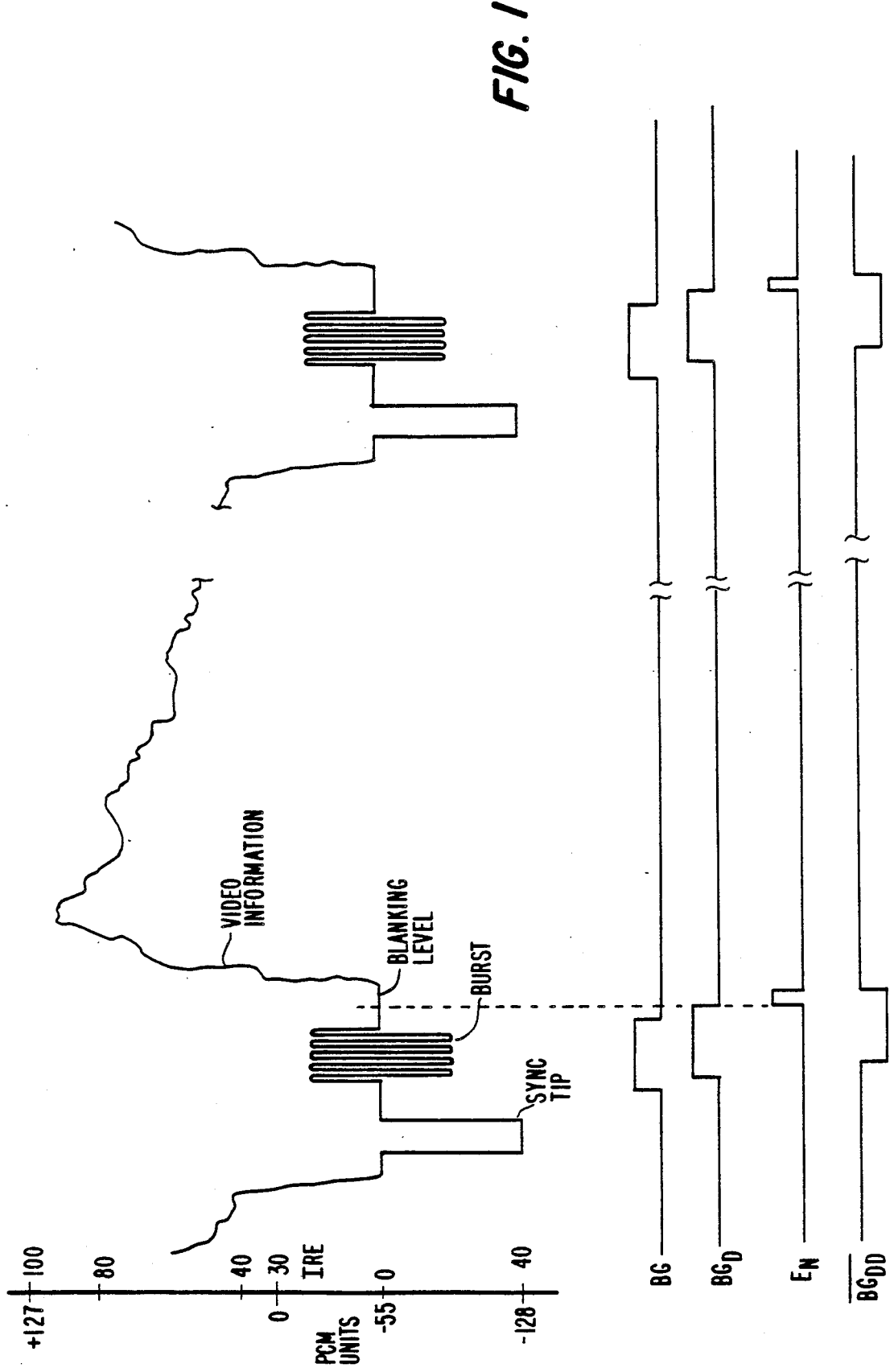
FIG. 1 is a waveform drawing of a portion of a video signal useful in describing the invention.

The upper waveform shown in FIG. 1 depicts one horizontal interval of a typical baseband composite video signal. The signal includes a horizontal synchronizing component, a blanking interval, a burst component, and a video information component corresponding to one line of the displayed image. In the NTSC standard, the blanking level is established at zero IRE units; the tip of the horizontal synchronizing component is established at minus 40 IRE units; the burst component swings between plus and minus 20 IRE units; and the peak of the information component is limited to 100 IRE units. The blanking level may be detected in the horizontal interval between the burst component and the information component of the video signal.

Color television receivers include circuitry for generating a burst gate signal, BG, which occurs during the burst interval and is utilized in detecting the burst signal. A sampling signal, EN, which occurs during the blanking level may readily be derived from a delayed burst gate signal $BG_D$, as will be discussed hereinafter.

In receivers which include digital signal processing apparatus, the received analog video signal is typically demodulated to baseband and clamped to the sync tip value. This signal is applied to the analog input terminal of an analog-to-digital converter ADC. The ADC, responsive to a system clock signal Fc converts the signal to pulse code modulated, PCM samples (e.g., binary samples) occurring at a sample rate equal to the frequency of the clock signal Fc.

In the following discussion it is assumed that the analog video signal is converted to 8-bit, two's complement, PCM samples. In this instance the range of sample values extends from minus 128 to plus 127 inclusive (decimal). The negative limit of −128 units corresponds to minus 40 IRE or sync tip; the positive limit of +128 units corresponds to 100 IRE; and zero corresponds to 30 IRE. The blanking level corresponds to a value of approximately minus 55 units, for an uncorrupted signal. However, whether or not the sync tip is greater or lesser than minus 40 IRE, the blanking level will be represented by a negative PCM number.

Figure 2:
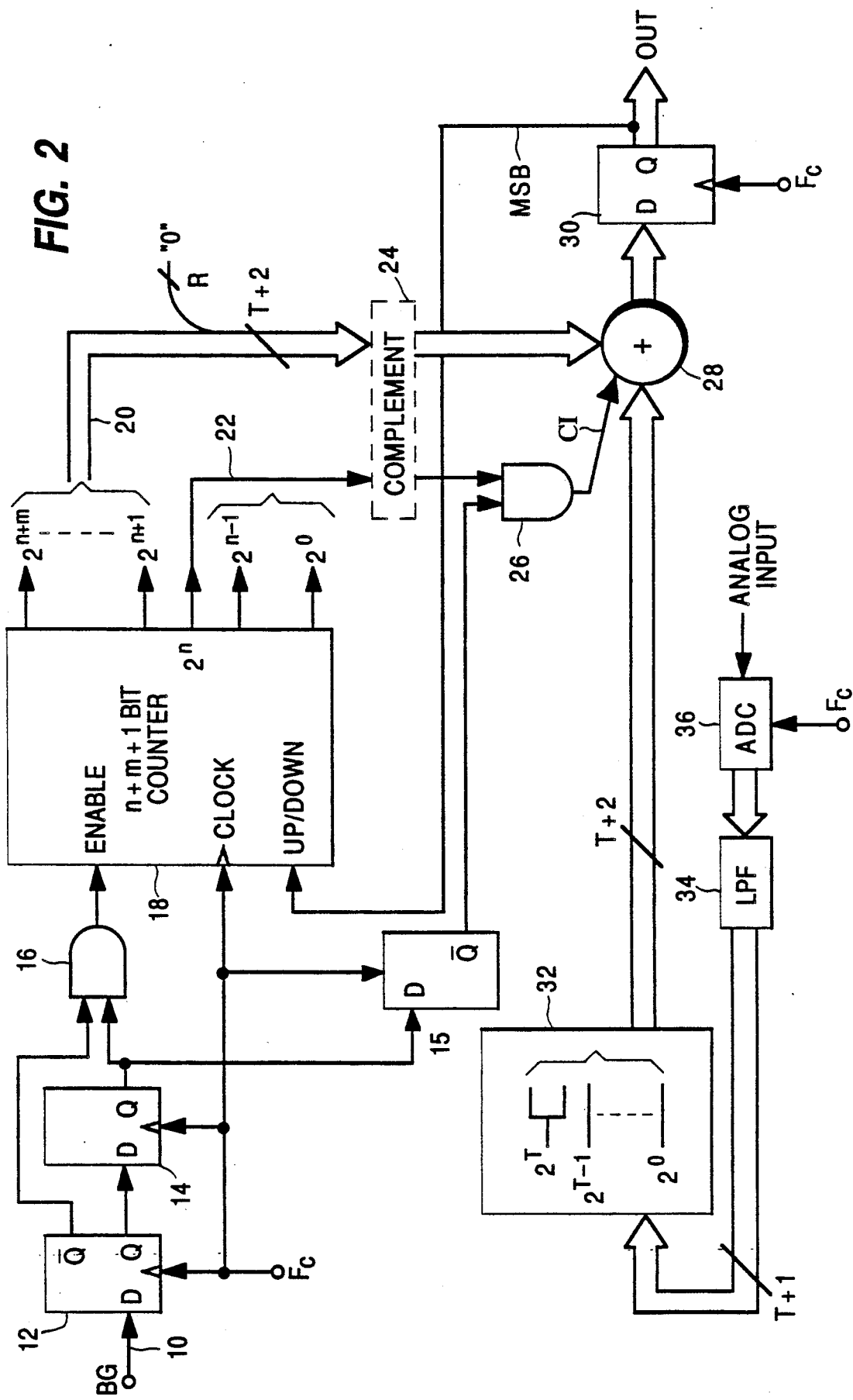
FIG. 2 is a block diagram of an exemplary digital clamp circuit embodying the invention.

Keeping these conditions in mind refer to FIG. 2. In FIG. 2 the broad arrows represent multibit parallel busses. A number adjacent a slash through a bus indicates the number of parallel connections in the bus.

An analog video signal is coupled to an ADC 36 which converts the signal to 8-bit twos complement PCM samples as described above. These samples are applied to a lowpass filter 34 which attenuates the burst component so that the blanking level extends from the horizontal synchronizing pulse to the start of the video information component. Output samples from the lowpass filter are coupled to element 32 which adds an extra bit to the samples by replicating the sign bit. That is, the input to element 32 are 8-bit samples with the most significant bit being the sign bit. The output from element 32 are nine bit samples with the two most significant bits corresponding to the sign bit of the input samples. Output samples from element 32 are coupled to one input port of a 9-bit adder 28. (Note the 8-bit samples from filter 34 are extended to 9-bits and a 9-bit adder is utilized in this arrangement to prevent the sum from the adder from being limited by the capacity of the adder, i.e., to preclude fold over.)

The output samples provided by the adder 28 are coupled to the data input port of a D-type latch 30.

Latch 30 responsive to the system clock Fc delays the samples from adder 28 by one sample period. Output samples OUT from latch 30 represent the clamped video output signal.

A value of magnitude equal to the blanking level but of opposite polarity is coupled to a second input port of the adder 28. This value is generated by an n+m+1 bit up/down counter 18. The up/down control of the counter 18 is responsive to the sign or most-significant-bit of the output signal OUT. If the output signal is negative (positive), the counter is conditioned to count up (down). The sign bit applied to the up/down control input of the counter is taken from the output of the latch 30 to insure that it is stable for the sampling period. Assume that the counter is enabled to count for one sample period during the blanking interval each line time. If during a sequence of horizontal line intervals the output signal is negative during the blanking interval, indicating that the value provided to the adder by the counter is less in magnitude than the blanking value applied to the other input port of adder 28, the counter will be conditioned to increment by one unit each line interval until the output signal is positive. Conversely if the output signal is positive during the blanking interval, the counter will be conditioned to decrement by one unit each line interval. Conceptually, once the magnitude of the value provided by the counter equals the magnitude of the blanking level, the counter will alternately increment and decrement by one unit on successive horizontal lines.

Since the counter is only enabled to increment/decrement during the blanking interval, the value provided to the adder 28 by the counter 18 does not change during the remainder of the horizontal interval. Thus, if the value provided by counter 18 is equal to A and the value of the signal samples provided by element 32 is S the value of the output samples will equal S +A.

The counter 18 is indicated as being an n+m+1 bit counter. The number represented by n+m+1 (where n and m are integers) may equal the number of bits per sample provided by the ADC 36. However, this is undesirable for two reasons. First, the count value will be susceptible to noise attendant the blanking signal and the counter may provide erroneous values to the adder 28. Second, from horizontal line-to-horizontal line the count value will alternate up and down by one unit. To preclude both of these conditions the counter is provided with excess bit capacity over the bits provided by the ADC. The lesser significant bits of the counter are truncated, and only the more significant bits from the counter are applied to the adder. This truncation effectuates a division of the count value which in turn tends to effectuate a low pass function to the measured values. Since the counter increments/decrements by one unit, and K bits of the counter are truncated, the output value applied to the adder may only change every $2^{K-1 th}$ line intervals depending on the direction of signal changes. During these $2^{K-1}$ line intervals, if the blanking level is contaminated by noise only during a few of these intervals the output count value may not change at all since during successive lines the counter has the opportunity to self correct.

In FIG. 2 the lesser significant counter output bits 0 to n are truncated and only the more significant bits n+1 to n+m are coupled to the adder. The number m of more significant bits must be at least large enough to represent the value of the signal level to be clamped. In the example indicated by FIG. 1 the number m of bits must be at least 6 to represent the magnitude 55 of the blanking level. To the m most significant bits from the counter 18, R zero valued bits are concatenated to the most significant bit positions. The number R is selected so that the sum of bits m+R is equal to the number of sample bits provided by element 32 which is equal to the input bit capacity of the adder. (The R bits are assigned zero value because the system was assumed to be operating with two's complement samples and the counter is assumed to be providing unsigned magnitude values.)

Another feature of the FIG. 2 clamp arrangement is that the blanking or clamp level measurement is performed using the truncated output from the counter but a rounded value from the counter is added to the remaining signal. This feature is implemented via an AND circuit 26. The most significant bit (n) of the truncated bits not applied to the adder is coupled to one input terminal of the AND circuit 26. A twice delayed and inverted burst gate signal BGDD developed in D-type latches 12, 14 and 15 is coupled to a second input terminal of the AND circuit 26. The delayed and inverted burst gate signal enables the AND circuit 26 to pass the $n^{th}$ truncated bit during the active video intervals and disables the AND circuit during the measurement portion of the blanking interval. The output signal from the AND circuit 26 is coupled to the carry input (CI) terminal of the adder 28. This adds a half unit (when present) to the counter output provided to the adder to effectuate rounding and improve the clamp level accuracy.

The enable signal for the counter is developed by the D-type latches 12 and 14 and the AND circuit 16. A burst gate signal such as the signal BG illustrated in FIG. 1 is applied to the data input terminal 10 of latch 12 wherein it is delayed one clock period. The Q output of latch 12 is coupled to the data input of latch 14 wherein it is delayed a second clock period. The inverted output $\overline{Q}$ of latch 12 and the output Q of latch 14 are applied to respective input terminals of the AND circuit 16 which produces an enable signal EN which is one clock period wide as illustrated in FIG. 1. The clock signal Fc which controls the latches 12 and 14 is also coupled to the clock input of counter 18. The clock signal conditions the counter to increment/decrement by one unit when the enable signal is high. Note, if desired, the enable pulse can be made several pulses wide enabling the counter to perform several successive measurements during a particular blanking interval.

In the foregoing discussion it has been assumed that the counter output values are coupled directly to the adder 28 and AND circuit 26. The system described is operable with these connections because the counter values are always positive valued and the blanking levels are always negative valued. However, in a more generalized system where the input signal clamping value is also positive valued the counter values must be inverted in polarity or complemented. This may be accomplished by including a complementing circuit 24 in the counter output signal paths. In this instance the sign bit coupled to the up/down control terminal must also be inverted. In an alternative arrangement the more significant R bits concatenated to the counter bits may be constrained to be one valued rather than zero valued which produces negative output values. In a still further alternative a subtractor circuit may be substituted for the adder circuit 28. Since in the general case either an adder circuit or a subtractor circuit may be implemented for adder 28, in the claims the generic term "combining circuit" will be used to describe this element.

Finally, regarding the counter 18, it is desirable that it be designed such that its output count does not fold over once it reaches its maximum or minimum count value. That is, if its count value is represented by all ones (all zeroes), a further increment (decrement) command will not produce a count value of all zeroes (all ones), but will retain an output of all ones (all zeroes).

What is claimed is:

1. A digital clamp circuit comprising:
a signal input terminal for applying a PCM input signal;
means for applying a clocking signal;
means for applying an enable signal having enable pulses occurring during predetermined intervals of said input signal;
a combining circuit having a first input terminal coupled to said signal input terminal, having a second input terminal and an output terminal; said output terminal for providing output signal including a polarity bit and signal value bits, said output signal corresponding to one of an additive and a subtractive combination of signal values applied to said first and second input terminals;
an up/down counter having a multibit output terminal for providing a count value, said up/down counter responsive to said clocking signal, said polarity bit and said enable signal for incrementing or decrementing said count value dependent upon the state of said polarity bit only during said predetermined intervals;
means for coupling said multibit output terminal of said up/down counter to the second input terminal of said combining circuit.

2. The digital clamp circuit set forth in claim 1 wherein said up/down counter is arranged to provide count values up to a count value equal to $2^{n+m}$, which values are represented by bits 0, 1, 2, ... n, n+1, ... n+m (m and n are integers greater than 0), where bit 0 is the least significant bit and bit m+n is the most significant bit, and wherein the means for coupling said multibit output terminal to said adder circuit couples only the m more significant bits representing the count values to the combining circuit.

3. The digital clamp circuit set forth in claim 1 further including a delay circuit having an input terminal coupled to the output terminal of said combining circuit and having an output terminal for providing output signal delayed by a plurality, including one, of periods of said clock signal, and wherein a polarity bit from said delayed output signal is coupled to said up/down counter.

4. A digital clamp circuit comprising:
a signal input port for applying a digital signal;
a combining circuit having a first input port coupled to said signal input port, having a second input port and having an output port for providing clamped signal including signal samples having a polarity bit;
an up/down counter having an up/down control input coupled to said polarity bit and having a count value output port;
means including dividing means coupled to the count value output port for providing divided count values to the second input port of said combining circuit; and
means for enabling said up/down counter to increment/decrement only during predetermined intervals of said input signal.

5. The digital clamp circuit set forth in claim 4 wherein said combining circuit is one of an adder and a subtracter circuit.

6. The digital clamp circuit set forth in claim 4 wherein said means including dividing means includes means for truncating said count values.

7. The digital clamp circuit set forth in claim 6 wherein said means including dividing means includes means for providing truncated count values to said combining circuit during said predetermined intervals and for providing truncated and rounded count values during intervals exclusive of said predetermined intervals.

8. A digital clamp circuit comprising:
a signal input port for applying a digital signal;
a combining circuit having a first input port coupled to said signal input port, having a second input port and having an output port for providing a clamped signal corresponding to one of a sum and a difference of signals applied to said first and second input ports, said clamped signal including a polarity bit;
an up/down counter responsive to the state of said polarity bit for incrementing or decrementing a count value, and having a count value output port coupled to the second input port of said combining circuit; and
means for enabling said up/down counter to increment or decrement only during predetermined intervals of said input signal.

9. A digital clamp circuit comprising:
a signal input terminal for applying a PCM input signal;
an input terminal for applying a timing signal;
means for applying a clocking signal;
means responsive to said timing signal for generating an enable signal having enable pulses occurring during predetermined intervals of said input signal;
a combining circuit having a first input terminal coupled to said signal input terminal, having a second input terminal, a carry input terminal and an output terminal, said output terminal for providing output signal corresponding to one of an additive and a subtractive combination of signal values applied to said first and second input terminals, said output signal comprising samples each including a polarity bit;
an up/down counter having a multibit output terminal for providing count values represented by n+1+m bits, said up/down counter responsive to said clocking signal, said polarity bit and said enable signal for incrementing or decrementing said count value dependent upon the state of said polarity bit only during said predetermined intervals;
means for coupling the m most significant bits of said count values provided by said up/down counter to the second input terminal of said combining circuit; and
means responsive to said timing signal for selectively coupling the m-1th most significant bit of said count value to said carry input terminal during intervals exclusive of said predetermined intervals.

* * * * *